United States Patent
Konno et al.

(10) Patent No.: US 10,045,344 B2
(45) Date of Patent: Aug. 7, 2018

(54) WIRELESS COMMUNICATION SYSTEM AND WIRELESS COMMUNICATION METHOD

(71) Applicant: KDDI CORPORATION, Tokyo (JP)

(72) Inventors: Makoto Konno, Tokyo (JP); Xiaoqiu Wang, Tokyo (JP); Fumio Watanabe, Tokyo (JP)

(73) Assignee: KDDI CORPORATION, Tokyo (JP)

(*) Notice: Subject to any disclaimer, the term of this patent is extended or adjusted under 35 U.S.C. 154(b) by 228 days.

(21) Appl. No.: 14/909,171

(22) PCT Filed: Aug. 13, 2014

(86) PCT No.: PCT/JP2014/071378
§ 371 (c)(1),
(2) Date: Feb. 1, 2016

(87) PCT Pub. No.: WO2015/022975
PCT Pub. Date: Feb. 19, 2015

(65) Prior Publication Data
US 2016/0165609 A1 Jun. 9, 2016

(30) Foreign Application Priority Data

Aug. 16, 2013 (JP) .................... 2013-169113

(51) Int. Cl.
*H04W 72/04* (2009.01)
*H04L 5/14* (2006.01)
(Continued)

(52) U.S. Cl.
CPC ....... *H04W 72/0453* (2013.01); *H04L 5/0044* (2013.01); *H04L 5/14* (2013.01);
(Continued)

(58) Field of Classification Search
None
See application file for complete search history.

(56) References Cited

U.S. PATENT DOCUMENTS

| | | | |
|---|---|---|---|
| 2011/0092209 A1* | 4/2011 | Gaal | H04W 16/12 455/436 |
| 2012/0014357 A1* | 1/2012 | Jung | H04L 5/0035 370/332 |

(Continued)

OTHER PUBLICATIONS

3GPP, TS36.104, "Evolved Universal Terrestrial Radio Access (E-UTRA); Base Station (BS) radio transmission and reception," Jul. 2013.

(Continued)

*Primary Examiner* — James P Duffy
(74) *Attorney, Agent, or Firm* — Greenblum & Bernstein, P.L.C.

(57) ABSTRACT

In a wireless communication system which can share the same frequency band with time division duplexing (TDD) and frequency division duplexing (FDD), a wireless terminal carries out an FDD downlink reception in a second frequency band overlapping a first frequency band allocated to TDD, thus carrying out reception at the TDD downlink reception timing. Alternatively, a wireless terminal carries out a TDD downlink reception in a second frequency band overlapping a first frequency band allocated to FDD, thus carrying out reception at the FDD downlink reception timing.

12 Claims, 6 Drawing Sheets

(51) Int. Cl.
*H04L 5/22* (2006.01)
*H04W 56/00* (2009.01)
*H04L 5/00* (2006.01)
*H04W 88/02* (2009.01)
*H04W 88/08* (2009.01)

(52) U.S. Cl.
CPC ............ *H04L 5/143* (2013.01); *H04L 5/1469* (2013.01); *H04L 5/22* (2013.01); *H04L 5/0007* (2013.01); *H04W 56/00* (2013.01); *H04W 88/02* (2013.01); *H04W 88/08* (2013.01)

(56) References Cited

U.S. PATENT DOCUMENTS

| | | |
|---|---|---|
| 2012/0307780 A1 | 12/2012 | Mochizuki et al. |
| 2015/0023228 A1* | 1/2015 | Yin .................. H04L 5/001 370/280 |

OTHER PUBLICATIONS

3GPP,TS36.101, "Evolved Universal Terrestrial Radio Access (E-UTRA); User Equipment (UE) radio transmission and reception," Jul. 2013.
KDDI, "Scenarios and Requirements for TDD-FDD Joint Operation", 3GPP R1-133300 (Aug. 9, 2013).
NTT DOCOMO, "Views on Deployment Scenarios and NW/UE Requirements for TDD-FDD Joint Operation", 3GPP RI-133454 (Aug. 10, 2013).
LG Electronics, "Discussion on Scenarios and UE requirements for TDD-FDD joint operation", 3GPP R1-133373 (Aug. 10, 2013).
RAN2, "LS on support of multiple frequency hand indicators in GERAN", 3GPP R4-131842 (Apr. 9, 2013).
Search Report issued by PCT patent office in PCT Patent Application No. PCT/JP2014/071378, dated Nov. 4, 2014 , along with an English translation thereof.

* cited by examiner

WIRELESS COMMUNICATION SYSTEM AND WIRELESS COMMUNICATION METHOD

TECHNICAL FIELD

The present invention relates to a wireless communication system and a wireless communication method using a duplex system.

The present application claims priority on Japanese Patent Application No. 2013-169113, the entire content of which is incorporated herein by reference.

BACKGROUND ART

Conventionally, time division duplexing (TDD) and frequency division duplexing (FDD) have been known as duplex systems. Herein, TDD allows for transmission and reception using the same frequency band in divided time slots while FDD allows for transmission and reception using divided frequency bands.

The 3GPP (3rd Generation Partnership Project) has standardized a wireless communication system (an LTE system), called LTE (Long Term Evolution), using FDD and TDD. The LTE system using TDD is called a TD-LTE system to be discriminated from another LTE system using FDD.

CITATION LIST

Non-Patent Literature Document

Non-Patent Literature Document 1: 3GPP, TS36.104, "Evolved Universal Terrestrial Radio Access (E-UTRA); Base Station (BS) radio transmission and reception", Internet <URL: http://www.3gpp.org/ftp/Specs/html-info/36104.htm>

Non-Patent Literature Document 2: 3GPP, TS36.101, "Evolved Universal Terrestrial Radio Access (E-UTRA); User Equipment (UE) radio transmission and reception", Internet <URL: http://www.3gpp.org/ftp/Specs/html-info/36101.htm>

SUMMARY OF INVENTION

Technical Problem

To allocate frequency bands available to wireless communication systems, frequency bands allocated to TDD may overlap frequency bands allocated to FDD. For example, frequency bands allocated to an FDD downlink may overlap frequency bands allocated to TDD. In this case, it is possible to improve frequency usage efficiency by way of a concurrence of FDD and TDD in the same frequency band. That is, it is possible to expect an improvement in frequency usage efficiency by submitting the same frequency band to a plurality of communication systems if a wireless FDD terminal is able to receive downlink signals from a TDD base station since a frequency band allocated to an FDD downlink overlaps a frequency band allocated to TDD.

The present invention is made in consideration of the above circumstances, and therefore the present invention aims to provide a wireless communication system and a wireless communication method which can share the same frequency band with FDD and TDD.

Solution to Problem (1) The present invention relates to a wireless terminal including a first wireless transceiver configured to carry out downlink reception according to frequency division multiplexing in a second frequency band overlapping a first frequency band allocated to time division multiplexing. The first wireless transceiver carries out reception at a downlink reception timing according to the time division multiplexing.

(2) The present invention relates to a wireless terminal including a first wireless transceiver configured to carry out uplink transmission according to frequency division duplexing in a second frequency band overlapping a first frequency band allocated to time division duplexing. The first wireless transceiver carries out transmission at an uplink transmission timing according to the time division duplexing.

(3) The present invention relates to a wireless terminal including a first wireless transceiver configured to carry out a communication according to time division duplexing in a second frequency band overlapping a first frequency band allocated to frequency division duplexing. The first wireless transceiver carries out reception at a downlink reception timing among transmission and reception according to the frequency division duplexing.

(4) The present invention relates to a wireless terminal including a first wireless transceiver configured to carry out a communication according to time division duplexing in a second frequency band overlapping a first frequency band allocated to frequency division duplexing. The first wireless transceiver carries out transmission among transmission and reception according to the frequency division duplexing.

(5) The present invention relates to the wireless terminal according to any one of (1) to (4), further including a second wireless transceiver configured to carry out a wireless communication in a third frequency band. The second wireless transceiver receives the frequency usage information, concerning the usage of the second frequency band, from a wireless base station carrying out a wireless communication in the third frequency band.

(6) The present invention relates to the wireless terminal according to (5), wherein the frequency usage information is the individual information depending on the communication performance for each wireless terminal.

(7) The present invention relates to the wireless terminal according to (5), wherein the frequency usage information is the common information for each wireless terminal.

(8) The present invention relates to the wireless terminal according to (7), wherein the frequency usage information is the information using a "Multiple Frequency Band Indicator" field.

(9) The present invention relates to the wireless terminal according to any one of (5) to (8), wherein the frequency usage information is the information designating a secondary cell in carrier aggregation.

(10) The present invention relates to a wireless base station including a wireless communication part configured to communicate with a wireless terminal. The wireless communication part transmits the frequency usage information, concerning the usage of a second frequency band allocated to frequency division duplexing and overlapping a first frequency band allocated to time division duplexing, to the wireless terminal.

(11) The present invention relates to a wireless base station including a wireless communication part configured to communicate with a wireless terminal. The wireless communication part transmits the frequency usage information, concerning the usage of a second frequency band allocated to time division duplexing and overlapping a first frequency band allocated to frequency division duplexing, to the wireless terminal.

(12) The present invention relates to the wireless base station according to (10) or (11), wherein the frequency usage information is the individual information for each wireless terminal.

(13) The present invention relates to the wireless base station according to (10) or (11), wherein the frequency usage information is the common information for each wireless terminal.

(14) The present invention relates to the wireless base station according to (13), wherein the frequency usage information is the information using a "Multiple Frequency Band Indicator" field.

(15) The present invention relates to the wireless base station according to any one of (10) to (14), wherein the frequency usage information is the information designating a secondary cell in carrier aggregation.

(16) The present invention relates to a wireless communication system including a wireless base station configured to communicate with a wireless terminal according to time division duplexing in a first frequency band, and a wireless terminal according to (1) or (2).

(17) The present invention relates to a wireless communication system including a wireless base station configured to communicate with a wireless terminal according to frequency division duplexing in a first frequency band, and a wireless terminal according to (3) or (4).

(18) The present invention relates to a wireless communication method including a reception step of carrying out downlink reception according to frequency division duplexing in a second frequency band overlapping a first frequency band allocated to time division duplexing. The reception step carries out reception at the downlink reception timing according to time division duplexing.

(19) The present invention relates to a wireless communication method including a transmission step of carrying out uplink transmission according to frequency division duplexing in a second frequency band overlapping a first frequency band allocated to time division duplexing. The transmission step carries out transmission at the uplink transmission timing according to time division duplexing.

(20) The present invention relates to a wireless communication method including a communication step of carrying out a communication according to time division duplexing in a second frequency band overlapping a first frequency band allocated to a downlink of frequency division duplexing. The communication step carries out reception at the downlink reception timing among transmission and reception according to time division duplexing.

(21) The present invention relates to a wireless communication method including a communication step of carrying out a communication according to time division duplexing in a second frequency band overlapping a first frequency band allocated to a downlink of frequency division duplexing. The communication step carries out transmission at the uplink transmission timing among transmission and reception according to time division duplexing.

Advantageous Effects of Invention

The present invention achieves an effect of sharing the same frequency band with time division duplexing (TDD) and frequency division duplexing (FDD).

DESCRIPTION OF EMBODIMENTS

The present invention concerning a wireless communication system and a wireless communication method will be described in detail with reference to the accompanying drawings.

First Embodiment

The first embodiment of the present invention will be described with respect to a wireless communication system in which a wireless FDD terminal wirelessly communicates with a wireless TDD base station when a frequency band allocated to TDD overlaps a frequency band allocated to FDD.

Figure 1:
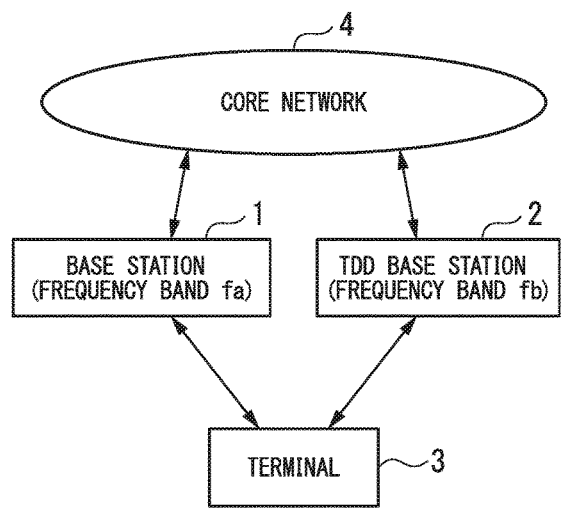
FIG. 1 is a configuration diagram of a wireless communication system according to the first embodiment of the present invention.

FIG. 1 shows the configuration of the wireless communication system according to the first embodiment of the present invention. The wireless communication system includes a base station 1, a TDD base station 2, a terminal 3, and a core network 4. The base station 1 uses a frequency band fa for a wireless communication. The base station 1 employs either TDD or FDD. The TDD base station 2 employs TDD using a frequency band fb for a wireless communication. Both the base station 1 and the TDD base station 2 are connected to the core network 4.

The communication range of the base station 1 overlaps the communication range of the TDD base station 2. The terminal 3 wirelessly communicates with the base station by use of the predetermined duplex system when it is located in the communication range of the base station 1, while the terminal 3 wirelessly communicates with the TDD base station 2 by use of TDD when it is located in the communication range of the TDD base station 2. The terminal 3 is able to wirelessly communicate with both the base station 1 and the TDD base station 2 when it is located in the area in which the communication range of the base station 1 overlaps the communication range of the TDD base station 2.

Figure 2:
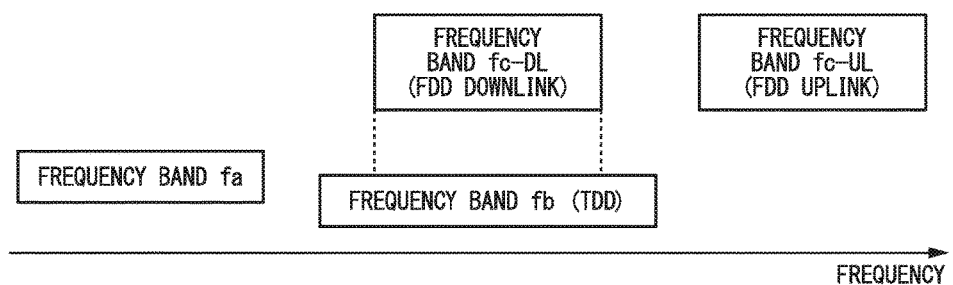
FIG. 2 is a frequency chart showing an example of a frequency allocation method in the wireless communication system of the present invention.

FIG. 2 shows an example of a frequency allocation method in the wireless communication system of the present invention. In FIG. 2, the frequency band fa of the base station 1 does not overlap the frequency band fb of the TDD base station 2. The frequency band fa corresponding to either TDD or FDD is set to the base station 1. The frequency band fb corresponding to TDD is set to the TDD base station 2. A frequency band fc corresponding to FDD refers to a downlink frequency band fc-DL (Down Link) destined from a base station to a terminal and an uplink frequency band fc-UL (Up Link) destined from a terminal to a base station. The FDD downlink frequency band fc-DL overlaps the frequency band fb of TDD. The FDD uplink frequency band fc-UL does not overlap any other frequency bands.

Figure 3:
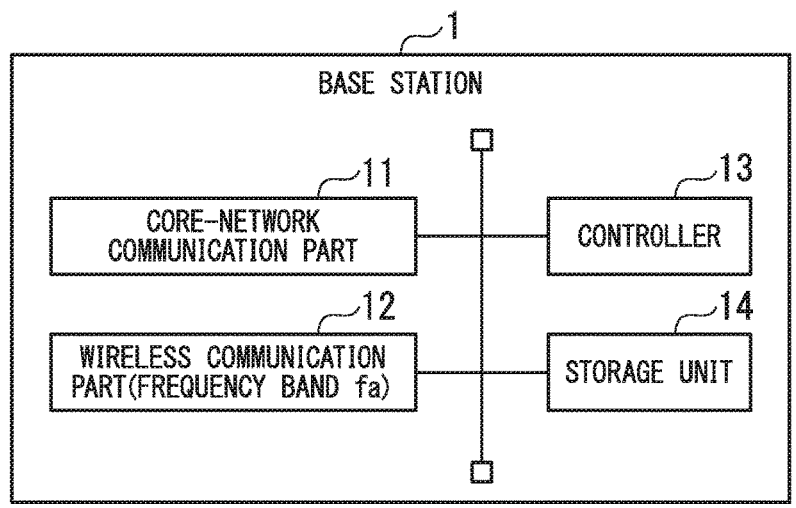
FIG. 3 is a block diagram showing the configuration of a base station according to the first embodiment.

FIG. 3 is a block diagram showing the configuration of the base station 1 according to the first embodiment. The base station 1 includes a core-network communication part 11, a wireless communication part 12, a controller 13, and a storage unit 14. These constituent elements are connected together to enable mutual data transmission or reception. The core-network communication part 11 communicates with another communication device through the core network 4. The wireless communication part 12 wirelessly communicates with the terminal 3 in the frequency band fa. The controller 13 controls the operation of the base station 1. The storage unit 14 stores various data.

Figure 4:
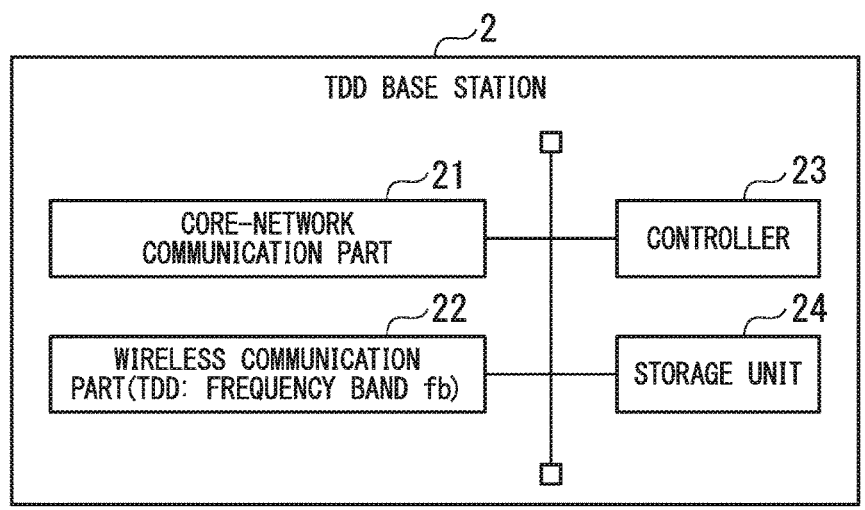
FIG. 4 is a block diagram showing the configuration of a TDD base station according to the first embodiment.

FIG. 4 is a block diagram showing the configuration of the TDD base station 2 according to the first embodiment. The TDD base station 2 includes a core-network communication part 21, a wireless communication part 22, a controller 23, and a storage unit 24. These constituent elements are connected together to enable mutual data transmission or reception. The core-network communication part 21 communicates with another communication device through the core network 4. The wireless communication part 22 wirelessly communicates with the terminal 3 by way of TDD in the frequency band fb. The controller 23 controls the operation of the TDD base station 2. The storage unit 24 stores various data.

Figure 5:
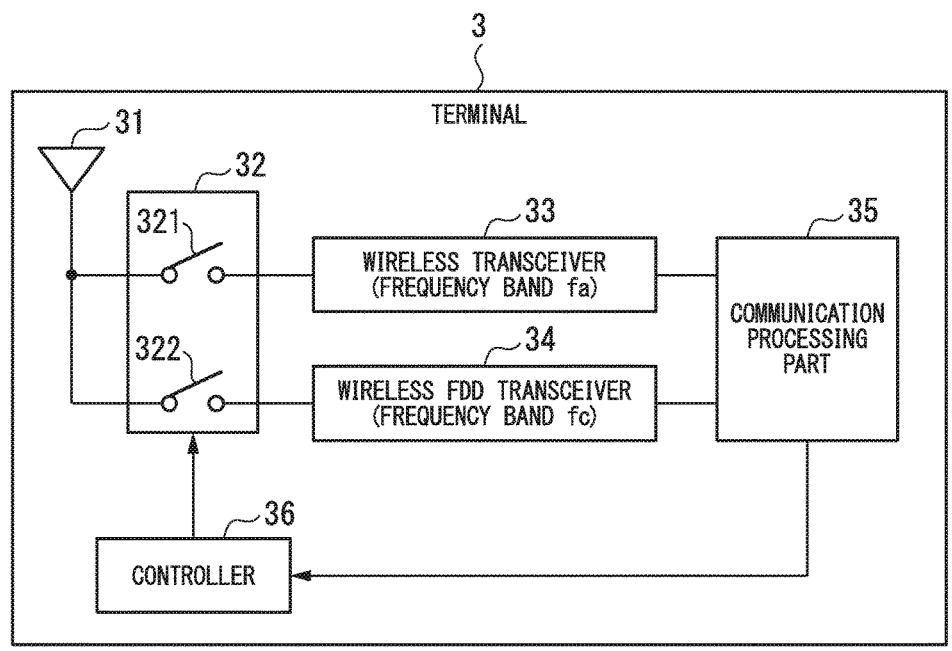
FIG. 5 is a block diagram showing the configuration of a terminal according to the first embodiment.

FIG. 5 is a block diagram showing the configuration of the terminal 3 according to the first embodiment. The terminal 3 includes an antenna 31, a switching unit 32, a wireless transceiver 33, a wireless FDD transceiver 34, a communication processing part 35, and a controller 36. The antenna 31 is connected to the switching unit 32. The switching unit 32 includes switches 321 and 322. The switch 321 turns on or off the connection between the antenna 31 and the wireless transceiver 33, while the switch 322 turns on or off the connection between the antenna 31 and the wireless FDD transceiver 34. In this connection, it is possible to preclude the switching unit 32 by installing the function of the switching unit 32 in the communication processing part 35.

When the switch 321 is turned on, the wireless transceiver 33 transmits or receives a wireless signal using the frequency band fa via the antenna 31. When the switch 322 is turned on, the wireless FDD transceiver 34 transmits or receives a wireless signal using the frequency band fc according to FDD via the antenna 31. As shown in FIG. 2 in which the FDD downlink frequency band fc-DL overlaps the frequency band fb of the TDD base station 2, the wireless FDD transceiver 34 is able to receive a wireless downlink signal of the TDD base station 2 in the frequency band fc-DL via the antenna 31 when the switch 322 is turned on.

The communication processing part 35 wirelessly communicates with the base station 1 through the wireless transceiver 33, wherein it is possible to carry out uplink and downlink communications with the base station 1. The communication processing part 35 wirelessly communicates with the TDD base station 2 through the FDD transceiver 34, wherein it is possible to carry out a single-direction or downlink communication with the TDD base station 2.

The controller 36 controls the switching unit 32. The controller 36 switches ON/OFF of the switch 321. The antenna 31 is connected to the wireless transceiver 33 when the switch 321 is turned on, while the antenna 31 is disconnected from the wireless transceiver 33 when the switch 321 is turned off.

The controller 36 switches ON/OFF of the switch 322. The antenna 31 is connected to the wireless FDD transceiver 34 when the switch 322 is turned on, while the antenna 31 is disconnected from the wireless FDD transceiver 34 when the switch 322 is turned off.

Figure 6:
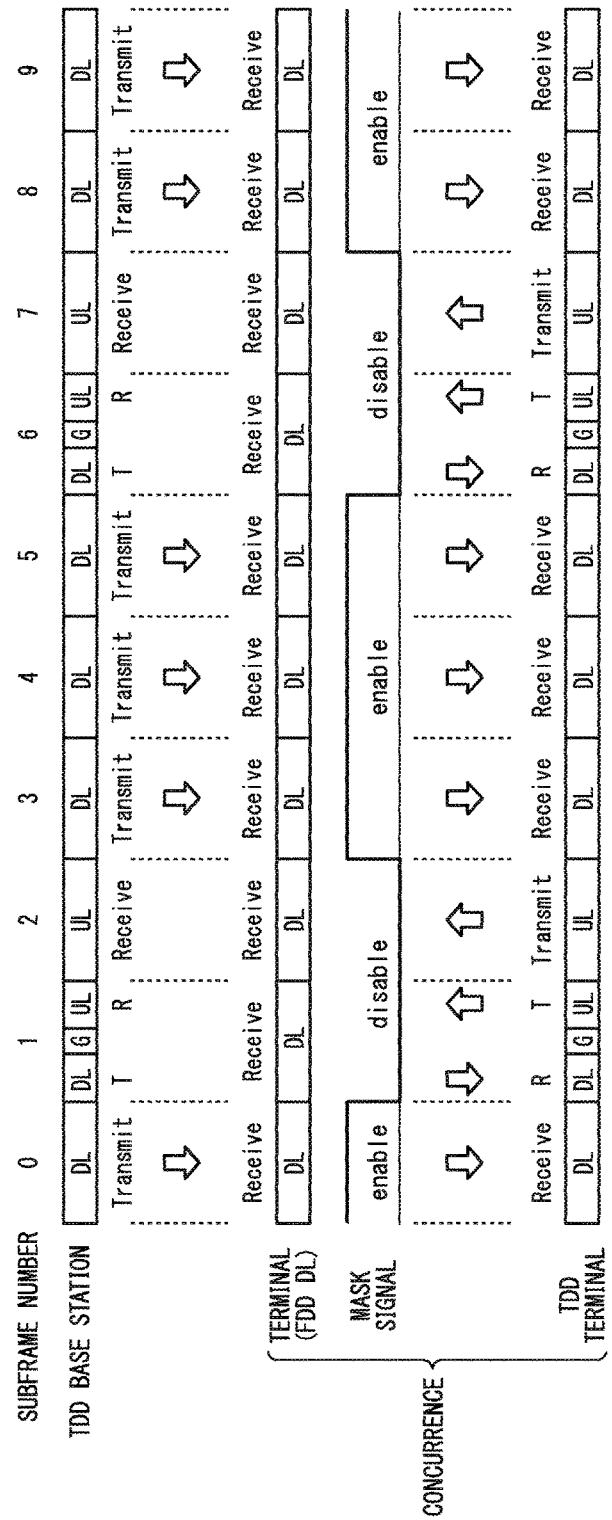
FIG. 6 is a timing chart showing a transmission-reception switching process using a mask signal in the terminal of the first embodiment.

The controller 36 switches ON/OFF of the switch 322 in response to a mask signal input from the communication processing part 35. FIG. 6 is a timing chart showing a switching process using a mask signal in the terminal 3 of the first embodiment. The mask signal becomes "enable" at the TDD downlink reception timing of the TDD base station 2 but "disable" at other timings.

The controller 36 turns on the switch 322 in an enable period (enable) of a mask signal, while the controller 36 turns off the switch 322 in a disable period (disable) of a mask signal. Thus, the antenna 31 is connected to the wireless FDD transceiver 34 when the switch 322 is turned on in an enable period (enable) of a mask signal, i.e. the TDD downlink reception timing of the TDD base station 2, and therefore the wireless FDD transceiver 34 receives a wireless downlink signal of the TDD base station 2 in the downlink frequency band fc-DL via the antenna 31.

On the other hand, the antenna 31 is disconnected from the wireless FDD transceiver 34 when the switch 322 is turned off in a disable period (disable) of a mask signal, i.e. any timing other than the downlink reception timing of the TDD base station 2, and therefore the wireless FDD transceiver 34 does not receive any wireless signal.

Next, the first embodiment of the present invention will be described with reference to Example 1 and Example 2. In Examples 1 and 2, the base station 1 provides a primary cell (Pcell) in carrier aggregation, while the TDD base station 2 provides a secondary cell (Scell) in carrier aggregation.

Example 1

In Example 1, the base station 1 transmits frequency usage information concerning the usage of frequency bands depending on the communication performance for each individual terminal. The base station 1 provides a wireless interactive communication service using the frequency band fa. The TDD base station 2 provides a wireless TDD communication service using the frequency band fb. The terminal 3 has a wireless interactive communication function using the frequency band fa and a wireless FDD communication function using the frequency band fc.

First, the terminal 3 connects (attach) to the base station 1. Next, the base station 1 adds (add) the TDD base station 2, serving as a secondary cell in carrier aggregation, to the terminal 3. At this time, the base station 1 transmits the frequency usage information concerning the usage of the downlink frequency band fc-DL depending on the communication performance of the terminal 3 (i.e. the wireless FDD communication function using the frequency band fc), to the terminal 3 having the wireless FDD communication function using the frequency band fc. The frequency usage information is produced based on the communication performance for each terminal. Hereinafter, the frequency usage information of Example 1 will be described below.

Herein, the LTE system will be described below. In an RRC (Radio Resource Control) message transmitted to the terminal 3, the frequency band fb described in the system information of the TDD base station 2 is overwritten with the downlink frequency band fc-DL. According to "TDD Configuration" of the frequency band fb, the information "Subframe Mask (bitmap)" representing a subframe used for reception of the terminal 3 is added to the system information. The information "Subframe Mask (bitmap)" corresponds to a mask signal shown in FIG. 6. Thus, the system information of the TDD base station 2 has a mask signal in the format of the downlink frequency band fc-DL.

The terminal having the wireless interactive communication function using the frequency band fa and the wireless TDD communication function using the frequency band fb is notified of the frequency band fb of TDD, serving as the system information of the base station 2, by use of an RCC message "Scell add". The system information of the TDD base station 2 has the format of the frequency band fb.

As the frequency usage information of Example 1, an RRC message "Scell add" depending on the communication performance for each terminal is transmitted to each terminal. Thus, the RRC message "Scell add" becomes inherent in each terminal.

Next, the terminal 3 receives an RRC message "Scell add" from the base station 1. The terminal 3 receives packets in the downlink frequency band fc-DL according to the subframe allocation result designated by the base station 1 based on the system information of the TDD base station 2 included in the RRC message "Scell add". In this connection, it is possible to obtain the subframe allocation result designated by the base station 1 by way of blind decoding (i.e. a round-robin detection method) on PDCCH (Physical Downlink Control Channel) of the base station 1 alone.

Example 2

In Example 2, the base station 1 transmits the common frequency usage information for each terminal. The base station 1 provides a wireless interactive communication service using the frequency band fa. The TDD base station 2 provides a wireless TDD communication service using the frequency band fb. The terminal 3 has a wireless interactive communication function using the frequency band fa and a wireless FDD communication function using the frequency band fc.

First, the terminal 3 connects (or attaches) to the base station 1. Next, the base station 1 adds the TDD base station 2, serving as a secondary cell in carrier aggregation, to the terminal 3. At this time, the base station 1 transmits the frequency usage information, concerning the usage of the downlink frequency band fc-DL, to the terminal 3. The frequency usage information is produced for each terminal in common. Hereinafter, the frequency usage information of Example 2 will be described below.

Herein, the LTE system will be described below. An RRC message "Scell add" transmitted to the terminal 3 includes the system information of the TDD base station 2 in the frequency band fb, the system information of the FDD-downlink frequency band fc-DL, and the information "Subframe Mask (bitmap)" representing a subframe for reception of the terminal 3. The system information of the FDD-downlink frequency band fc-DL may use a "Multiple Frequency Band Indicator" field in an RCC message "Scell add". The information "Subframe Mask (bitmap)" depends on "TDD Configuration" of the frequency band fb. The information "Subframe Mask (bitmap)" corresponds to a mask signal shown in FIG. 6.

The same message as the RRC message "Scell add" to be transmitted to the terminal 3 will be transmitted to a terminal having a wireless interactive communication function using the frequency band fa and a wireless TDD communication function using the frequency band fb.

As the frequency usage information of Example 2, an RRC message "Scell add" for each terminal in common is transmitted to each terminal. The RRC message "Scell add" is not dependent on the communication performance for each terminal but inherent in each base station. The above description refers to the frequency usage information of Example 2.

Next, the terminal 3 receives an RRC message "Scell add" from the base station 1. The terminal 3 obtains the information "Subframe Mask (bitmap)" and the system information of the FDD-downlink frequency band fc-DL, depending on the communication performance thereof (i.e. the wireless FDD communication function using the frequency band fc), from the RRC message "Scell add". Based on the system information of the FDD-downlink frequency band fc-DL and the information "Subframe Mask (bitmap)", the terminal 3 receives packets in the downlink frequency band fc-DL according to the subframe allocation result designated by the base station 1. In this connection, it is possible to obtain the subframe allocation result designated by the base station 1 by way of blind decoding (i.e. a round-robin detection method) on PDCCH of the base station 1 alone.

According to the first embodiment of the present invention, it is possible for the FDD terminal 3 to receive a wireless downlink signal of the TDD base station 2 in the downlink frequency band fc-DL. Thus, it is possible to obtain an effect of sharing the same frequency band with FDD and TDD.

In the first embodiment of the present invention, the FDD terminal 3 receives a wireless downlink signal from the TDD base station 2 when the frequency band fb allocated to TDD overlaps the downlink frequency band fc-DL allocated to FDD. Additionally, the FDD terminal 3 is able to transmit a wireless uplink signal to the TDD base station 2 even when the frequency band fb allocated to TDD overlaps the uplink frequency band fc-UL allocated to FDD.

In the situation where the frequency band fb allocated to TDD overlaps the uplink frequency band fc-UL for FDD, a mask signal becomes "enable" at the TDD-uplink transmission timing of the TDD base station 2 when the FDD terminal 3 transmits a wireless uplink signal to the TDD base station 2, while it becomes "disable" at other timings.

In the first embodiment of the present invention, it is possible for the TDD base station 2 to prioritize the FDD terminal 3 rather than the TDD terminal when allocating wireless resources to each terminal.

Second Embodiment

In the second embodiment of the present invention, the wireless TDD terminal wirelessly communicates with the wireless FDD base station when the frequency band allocated to TDD overlaps the frequency band allocated to FDD.

Figure 7:
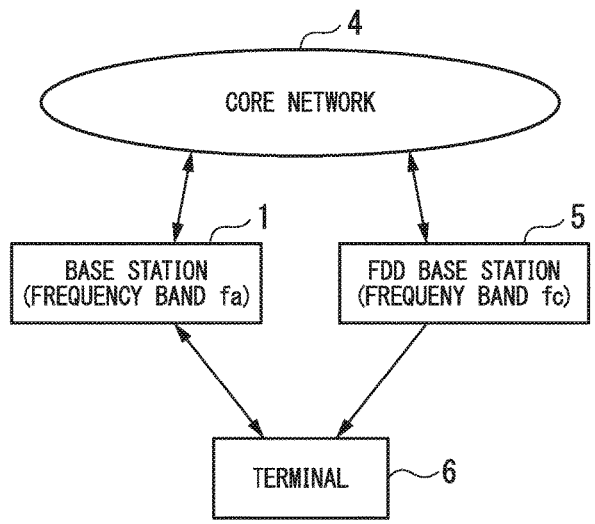
FIG. 7 is a configuration diagram of a wireless communication system according to the second embodiment of the present invention.

FIG. 7 is a configuration diagram of a wireless communication system according to the second embodiment of the present invention. The wireless communication system includes an FDD base station 5 and a terminal 6 as well as the base station 1 and the core network 4. The base station 1 uses the frequency band fa for a wireless communication. The base station 1 may employ a duplex system either TDD or FDD. The FDD base station 5 uses the frequency band fc for a wireless FDD communication. The base station 1 and the FDD base station 5 are connected to the core network 4.

The communication range of the base station 1 overlaps the communication range of the FDD base station 5. The terminal 6 is able to wirelessly communicate with the base station 1 when it is located in the communication range of the base station 1. Additionally, the terminal 6 is able to wirelessly communicate with the FDD base station 5 when it is located in the communication range of the FDD base station 5. The terminal 6 is able to wirelessly communicate with both the base station 1 and the FDD base station 5 when it is located in the area in which the communication range of the base station 1 overlaps the communication range of the FDD base station 5.

The second embodiment of the present invention adopts the same frequency allocation method shown in FIG. 2. In the frequency band fc of the FDD base station 5, the downlink frequency band fc-DL overlaps the frequency band fb of TDD. The frequency allocation method shown in FIG. 2 is illustrative but not restrictive.

Figure 8:
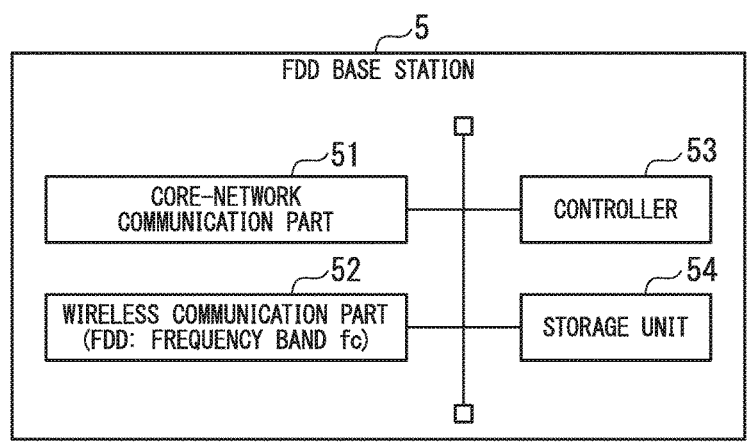
FIG. 8 is a block diagram showing the configuration of an FDD base station according to the second embodiment.

The base station 1 of the second embodiment has the configuration shown in FIG. 3. FIG. 8 is a block diagram showing the configuration of the FDD base station 5 according to the second embodiment. The FDD base station 5 includes a core-network communication part 51, a wireless communication part 52, a controller 53, and a storage unit 54. These constituent elements are connected together to enable mutual data transmission/reception. The core-network communication part 51 communicates with another communication device through the core network 4. The wireless communication part 52 wirelessly communicates with the terminal 6 in the frequency band fc by way of FDD. The controller 53 controls the operation of the FDD base station 5. The storage unit 54 stores various data.

Figure 9:
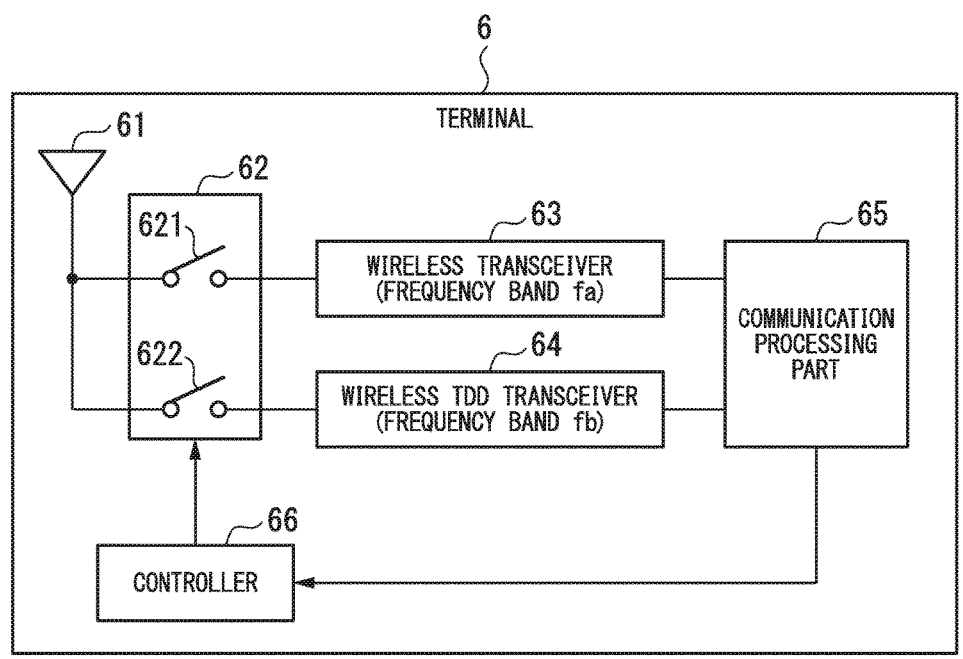
FIG. 9 is a block diagram showing the configuration of a terminal according to the second embodiment.

FIG. 9 is a block diagram showing the configuration of the terminal 6 according to the second embodiment. The terminal 6 includes an antenna 61, a switching unit 62, a wireless transceiver 63, a wireless TDD transceiver 64, a communication processing part 65, and a controller 66. The antenna 61 is connected to the switching unit 62. The switching unit 62 includes switches 621 and 622. The switch 621 turns on or off the connection between the antenna 61 and the wireless transceiver 63. The switch 622 turns on or off the connection between the antenna 61 and the wireless TDD transceiver 64. In this connection, it is possible to preclude the switching unit 62 by installing the function of the switching unit 62 in the communication processing part 65.

The wireless transceiver 63 transmits or receives a wireless signal with the base station 1 in the frequency band fa via the antenna 61 when the switch 621 is turned on.

The wireless TDD transceiver 64 has a function of transmitting or receiving a wireless signal in the frequency band fb according to TDD. In the second embodiment, as shown in FIG. 2, the frequency band fb of the wireless TDD transceiver 64 overlaps the downlink frequency band fc-DL in the frequency band fc of the FDD base station 5. Thus, the wireless TDD transceiver 64 is able to receive a wireless downlink signal of the FDD base station 5 in part of the frequency band fb overlapping the frequency band fc-DL via the antenna 61 when the switch 622 is turned on.

The communication processing part 65 wirelessly communicates with the base station 1 through the wireless transceiver 63. The terminal 6 is able to wirelessly communicate with the base station 1 in both the uplink and downlink directions. The communication processing part 65 wirelessly communicates with the FDD base station 5 through the wireless TDD transceiver 64. The terminal 6 is able to communicate with the FDD base station 5 in a single direction, i.e. a downlink direction.

The controller 66 controls the switching unit 62. The controller 66 switches ON/OFF of the switch 621. The antenna 61 is connected to the wireless transceiver 63 when the switch 621 is turned on. The antenna 61 is disconnected from the wireless transceiver 63 when the switch 621 is turned off.

The controller 66 switches ON/OFF of the switch 622. The antenna 61 is connected to the wireless TDD transceiver 64 when the switch 622 is turned on. The antenna 61 is disconnected from the wireless TDD transceiver 64 when the switch 622 is turned off.

The controller 66 switches ON/OFF of the switch 622 in response to a mask signal input from the communication processing part 65. The second embodiment employs a mask signal shown in FIG. 6, wherein the mask signal becomes "enable" at the TDD-downlink reception timing, while the mask signal becomes "disable" at other timings.

The controller 66 turns on the switch 622 in an enable period (enable) of a mask signal, while the controller 66 turns off the switch 622 in a disable period (disable) of a mask signal. Thus, the antenna 61 is connected to the wireless TDD transceiver 64 when the switch 622 is turned on in an enable period of a mask signal, i.e. at the TDD-downlink reception timing, and therefore the wireless TDD transceiver 64 receives a wireless downlink signal of the FDD base station 5 in part of the frequency band fb overlapping the downlink frequency band fc-DL via the antenna 61.

On the other hand, the antenna 61 is disconnected from the wireless TDD transceiver 64 when the switch 622 is turned off in a disable period of a mask signal, i.e. at any timing other than the TDD-downlink reception timing. This prevents the wireless TDD transceiver 64 from transmitting a wireless signal.

Next, the second embodiment of the present invention will be described with reference to Example 3 and Example 4. In Examples 3 and 4, the base station 1 provides a primary cell (Pcell) in carrier aggregation while the FDD base station 5 provides a secondary cell (Scell) in carrier aggregation.

Example 3

In Example 3, the base station 1 transmits the frequency usage information, depending on the communication performance for each terminal, to each individual terminal. The base station 1 provides a wireless interactive communication service using the frequency band fa. The FDD base station 5 provides a wireless communication service using the frequency band fc according to FDD. The terminal 6 has a wireless interactive communication function using the frequency band fa and a wireless TDD communication function using the frequency band fb.

First, the terminal 6 connects (or attaches) to the base station 1. Next, the base station 1 adds to a terminal the FDD base station 5 serving as a secondary cell in carrier aggregation. The base station 1 transmits the frequency usage information concerning the usage of the frequency band fb, depending on the communication performance of the terminal 6 (i.e. the wireless TDD communication function using the frequency band fb), to the terminal 6 having the wireless TDD communication function in the frequency band fb. The frequency usage information is produced depending on the communication performance for each terminal. Hereinafter, the frequency usage information of Example 3 will be described below.

Herein, the LTE system will be described below. In an RRC message "Scell add" transmitted to the terminal 6, the frequency band fc in the system information of the FDD base station 5 is overwritten with the frequency band fb, while the information "TDD Configuration" is added to the system information. As the information "TDD Configuration", it is possible to use the information "TDD Configuration" having the largest number of downlink sub-frames. The information "TDD Configuration" added to the system information of the FDD base station 5 corresponds to a mask signal shown in FIG. 6. Thus, the system information of the FDD base station 5 has the format of the frequency band fb.

In this connection, a terminal having a wireless interactive communication function using the frequency band fa and a wireless FDD communication function using the frequency band fc is notified of the frequency band fc of FDD, serving as the system information of the FDD base station 5, by use of an RRC message "Scell add". In this case, the system information of the FDD base station 5 has the format of the frequency band fc.

As the frequency usage information of Example 3, an RRC message "Scell add" depending on the communication performance for each terminal is transmitted to each terminal. Thus, the RRC message "Scell add" becomes inherent in each terminal. The above description refers to the frequency usage information of Example 3.

Next, the terminal 6 receives an RRC message "Scell add" from the base station 1. Based on the system information of the FDD base station 5 included in the RRC message "Scell add", the terminal 6 receives downlink packets in part of the frequency band fb overlapping the downlink frequency band fc-DL according to the subframe allocation result designated by the base station 1. In this connection, it is possible to obtain the subframe allocation result designated by the base station 1 by way of blind decoding (i.e. a round-robin detection method) on PDCCH of the base station 1 alone.

Example 4

In Example 4, the base station 1 transmits the frequency usage information for each terminal in common. The base station 1 provides a wireless interactive communication service using the frequency band fa. The FDD base station 5 provides a wireless FDD communication service using the frequency band fc. The terminal 6 has a wireless interactive communication function using the frequency band fa and a wireless TDD communication function using the frequency band fb.

First, the terminal 6 connects (or attaches) to the base station 1. Next, the base station 1 adds the FDD base station 5, serving as a secondary cell in carrier aggregation, to the terminal 6. At this time, the base station 1 transmits the frequency usage information, concerning the usage of the frequency band fb, to the terminal 6. The frequency usage information is produced for each terminal in common. Hereinafter, the frequency usage information of Example 4 will be described below.

Herein, the LTE system will be described below. An RRC message "Scell add" transmitted to the terminal 6 includes the system information of the FDD base station 5 in the frequency band fc and the system information of TDD in the frequency band fb. As the system information of TDD in the frequency band fb, it is possible to use a "Multiple Frequency Band Indicator" field in an RRC message "Scell add". As the information "TDD Configuration" of the system information of TDD in the frequency band fb, it is possible to use the information "TDD Configuration" having the largest number of downlink sub-frames. The information "TDD Configuration" of the system information of TDD in the frequency band fb corresponds to a mask signal shown in FIG. 6.

In this connection, the same message as the RRC message "Scell add" to be transmitted to the terminal 6 will be transmitted to a terminal having a wireless interactive communication function using the frequency band fa and a wireless FDD communication function using the frequency band fc. As the frequency usage information of Example 4, an RRC message "Scell add" for each terminal in common is transmitted to each terminal. Thus, the RRC message "Scell add" is not dependent on the communication performance for each terminal but inherent in each base station.

Next, the terminal 6 receives an RRC message "Scell add" from the base station 1. The terminal 6 obtains the system information of TDD in the frequency band fb, depending on the communication performance thereof (i.e. the wireless TDD communication function in the frequency band fb), in the RRC message "Scell add". Based on the system information of TDD in the frequency band fb, the terminal 6 receives packets in part of the frequency band fb overlapping the downlink frequency band fc-DL according to the subframe allocation result designated by the base station 1. In this connection, it is possible to obtain the subframe allocation result designated by the base station 1 by way of blind decoding (i.e. a round-robin detection method) on PDCCH of the base station 1 alone.

According to the second embodiment of the present invention, it is possible for the TDD terminal 6 to receive a wireless downlink signal of the FDD base station 5 in part of the frequency band fb overlapping the downlink frequency band fc-DL. Thus, it is possible to share the same frequency band with FDD and TDD.

In the second embodiment of the present invention, the TDD terminal 6 receives a wireless downlink signal from the FDD base station 5 when the frequency band fb allocated to TDD overlaps the downlink frequency band fc-DL allocated to an FDD downlink. Additionally, the TDD terminal 6 is able to transmit a wireless uplink signal to the FDD base station 5 when the frequency band fb allocated to TDD overlaps the uplink frequency band bc-UL allocated to an FDD uplink.

In the situation where the frequency band fb allocated to TDD overlaps the uplink frequency band fc-UL allocated to an FDD uplink, a mask signal becomes "enable" at the TDD uplink transmission timing when the TDD terminal 6 transmits a wireless uplink signal to the FDD base station 5, while the mask signal becomes "disable" at other timings.

In the second embodiment of the present invention in which the FDD base station 5 allocates wireless resources to terminals, it is possible to prioritize the TDD terminal 6 rather than the FDD terminal.

The present invention is described by way of the foregoing embodiments and examples with reference to the accompanying drawings. However, the present invention is not necessarily limited to the foregoing embodiments in terms of concrete configurations and functions; hence, the present invention may embrace any modifications or design changes without departing from the subject matter of the invention.

INDUSTRIAL APPLICABILITY

The present invention can be applied to mobile communication systems or cellular systems adapted to a plurality of wireless communication methods. For example, the present invention is applicable to wireless communication systems based on LTE standards (i.e. LTE systems) and wireless communication systems based on LTE-advanced standards (i.e. LTE-advanced systems).

REFERENCE SIGNS LIST 1 base station
2 TDD base station
3, 6 terminal
4 core network
5 FDD base station
11, 21, 51 core-network communication part
12, 22, 52 wireless communication part
13, 23, 53 controller
14, 24, 54 storage unit
31, 61 antenna
32, 62 switching unit
321, 322, 621, 622 switch
33, 63 wireless transceiver
34 wireless FDD transceiver
64 wireless TDD transceiver
35, 65 communication processing part
36, 66 controller

The invention claimed is:

1. A wireless terminal comprising:
a first wireless transceiver configured to carry out downlink reception according to frequency division duplexing in a second frequency band overlapping a first frequency band allocated to time division duplexing, wherein the first wireless transceiver carries out reception at a downlink reception timing according to the time division duplexing; and
a second wireless transceiver configured to carry out a wireless communication in a third frequency band, wherein the second wireless transceiver receives frequency usage information, concerning a usage of the second frequency band, from a wireless base station carrying out the wireless communication in the third frequency band.

2. A wireless terminal comprising:
a first wireless transceiver configured to carry out uplink transmission according to frequency division duplexing in a second frequency band overlapping a first frequency band allocated to time division duplexing, wherein the first wireless transceiver carries out transmission at an uplink transmission timing according to the time division duplexing; and
a second wireless transceiver configured to carry out a wireless communication in a third frequency band, wherein the second wireless transceiver receives frequency usage information, concerning a usage of the second frequency band, from a wireless base station carrying out the wireless communication in the third frequency band.

3. A wireless terminal comprising:
a first wireless transceiver configured to carry out a communication according to time division duplexing in a second frequency band overlapping a first frequency band allocated to a downlink of frequency division duplexing, wherein the first wireless transceiver carries out reception at a downlink reception timing among transmission and reception according to the frequency division duplexing; and
a second wireless transceiver configured to carry out a wireless communication in a third frequency band, wherein the second wireless transceiver receives frequency usage information, concerning a usage of the second frequency band, from a wireless base station carrying out the wireless communication in the third frequency band.

4. A wireless terminal comprising:
a first wireless transceiver configured to carry out a communication according to time division duplexing in a second frequency band overlapping a first frequency band allocated to an uplink of frequency division duplexing, wherein the first wireless transceiver carries out transmission among transmission and reception according to the frequency division duplexing; and
a second wireless transceiver configured to carry out a wireless communication in a third frequency band, wherein the second wireless transceiver receives frequency usage information, concerning a usage of the second frequency band, from a wireless base station carrying out the wireless communication in the third frequency band.

5. The wireless terminal according to claim 1, wherein the frequency usage information designates a secondary cell for a carrier aggregation.

6. A wireless base station comprising a wireless communication part configured to communicate with a wireless terminal including a wireless transceiver configured to carry out downlink reception according to frequency division duplexing in a second frequency band overlapping a first frequency band allocated to time division and to thereby carry out reception at a downlink reception timing according to the time division duplexing, wherein the wireless communication part transmits frequency usage information, concerning a usage of the second frequency band overlapping the first frequency band to the wireless terminal.

7. A wireless base station comprising a wireless communication part configured to communicate with a wireless terminal including a wireless transceiver configured to carry out a communication according to time division duplexing in a second frequency band overlapping a first frequency band allocated to a downlink of frequency division duplexing and to thereby carry out reception at a downlink reception timing among transmission and reception according to the frequency division duplexing, wherein the wireless communication part transmits frequency usage information, concerning a usage of the second frequency band overlapping the first frequency band to the wireless terminal.

8. The wireless base station according to claim 6, wherein the frequency usage information designates a secondary cell for a carrier aggregation.

9. A wireless communication method adapted to a wireless terminal communicating with a wireless base station, the wireless communication method comprising:
carrying out downlink reception according to frequency division duplexing in a second frequency band overlapping a first frequency band allocated to time division duplexing at a downlink reception timing according to the time division duplexing; and
carrying out a wireless communication in a third frequency band upon receiving frequency usage information, concerning a usage of the second frequency band, from the wireless base station.

10. A wireless communication method adapted to a wireless terminal communicating with a wireless base station, the wireless communication method comprising:
carrying out uplink transmission according to frequency division duplexing in a second frequency band overlapping a first frequency band allocated to time division duplexing at an uplink transmission timing according to the time division duplexing; and
carrying out a wireless communication in a third frequency band upon receiving frequency usage information, concerning a usage of the second frequency band, from the wireless base station.

11. A wireless communication method adapted to a wireless terminal communicating with a wireless base station, the wireless communication method comprising:
   carrying out a communication according to time division duplexing in a second frequency band overlapping a first frequency band allocated to a downlink of frequency division duplexing at a downlink reception timing among transmission and reception according to the time division duplexing; and
   carrying out a wireless communication in a third frequency band upon receiving frequency usage information, concerning a usage of the second frequency band, from the wireless base station.

12. A wireless communication method adapted to a wireless terminal communicating with a wireless base station, the wireless communication method comprising:
   carrying out a communication according to time division duplexing in a second frequency band overlapping a first frequency band allocated to a downlink of frequency division duplexing at an uplink transmission timing among transmission and reception according to the time division duplexing; and
   carrying out a wireless communication in a third frequency band upon receiving frequency usage information, concerning a usage of the second frequency band, from the wireless base station carrying out the wireless communication in the third frequency band.

* * * * *